Oct. 22, 1935.   A. J. MUCHOW   2,018,463
SONIC LOCATOR SYSTEM
Filed April 12, 1935
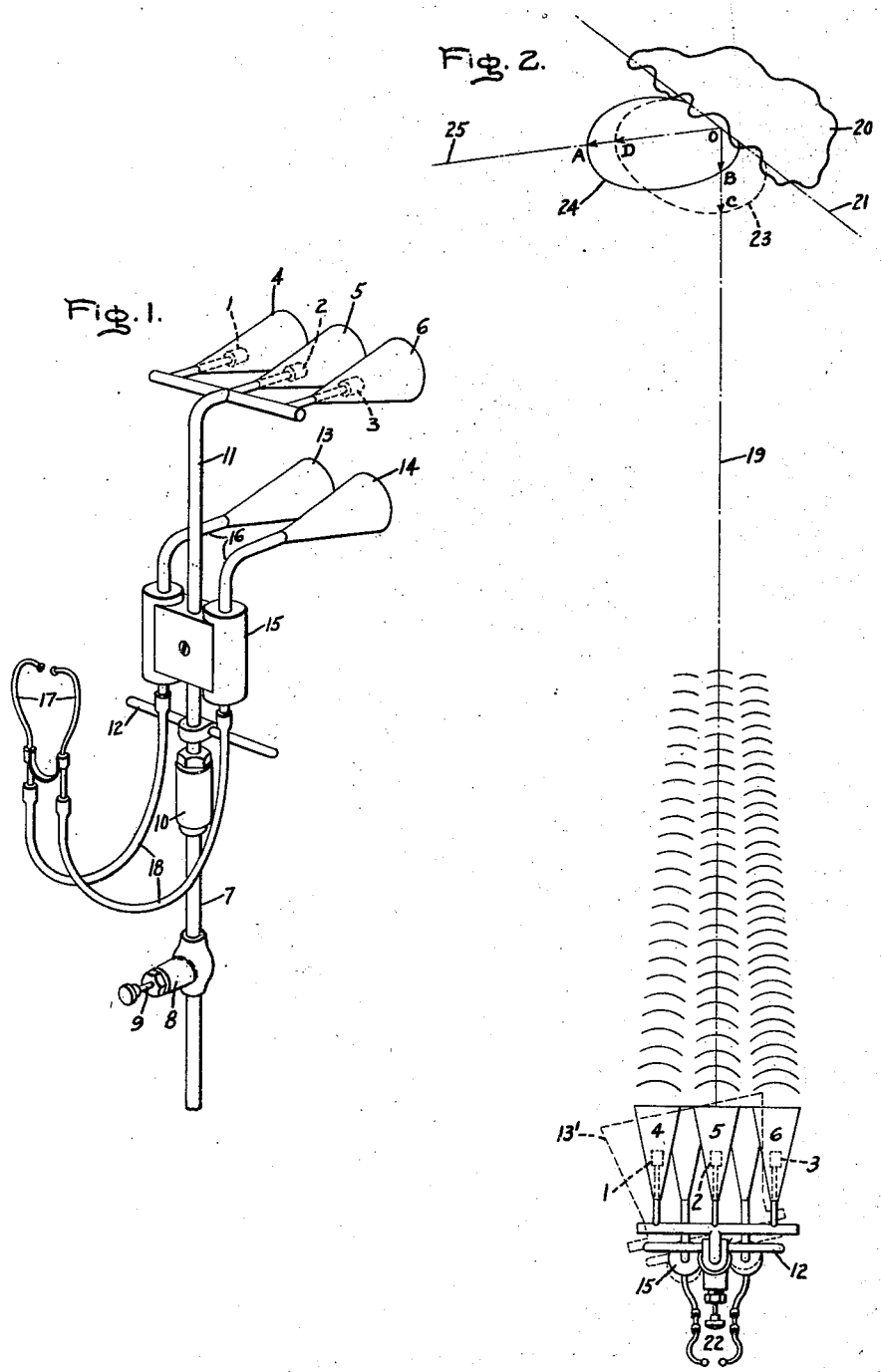
Inventor:
Albert J. Muchow,
by Harry E. Dunham
His Attorney.

Patented Oct. 22, 1935

2,018,463

UNITED STATES PATENT OFFICE 2,018,463

SONIC LOCATOR SYSTEM

Albert J. Muchow, Scotia, N. Y., assignor to General Electric Company, a corporation of New York Application April 12, 1935, Serial No. 16,017

8 Claims. (Cl. 181—0.5)

My invention relates to a system for locating the position of an object with respect to a particular point, and more particularly to such a system in which reflected sound waves are employed to indicate the location of the object with respect to an auditor's position.

Sound echo systems have been extensively employed in the past in navigation work as a means for establishing the location of an object with reference to an auditor's position. In general, the present known sonic locator systems comprise the method of propagating sound waves from a position adjacent that of the auditor in the direction of an object to be located and utilizing those waves which are reflected from the object to establish the direction of the object by affecting the binaural sense of the auditor. Spaced apart listening horns are usually employed as a means for conducting the reflected sound waves to the auditor's ears.

In accordance with the well-known binaural effect, when sound is transmitted to the horns which are connected to convey the sound to the auditor's ears, the sense of hearing subjectively assigns a direction to the source thereof. This binaural effect may, therefore, be used to indicate the direction from which sound is emanating and thus guide the auditor in rotating the horns until the volume of the received sound is a maximum, in which position, a line normal to and intersecting the line extending between the outer extremities of the receiving horns will pass through the sound source. Thus it will be understood that if the received sound emanates from a sound reflecting surface the normal line noted above will pass through the object having the reflecting surface. Hence the normal line indicates the direction of the object with respect to the auditor's position.

It has been found that in the above arrangement it is particularly advantageous to employ high frequency sound as the propagated signal media. High frequency sound waves are characterized by the fact that they may be easily generated by small sound generators and may be projected in the selected direction by small transmitting horns. This permits the transmitting apparatus to be reduced in size thereby increasing the flexibility of operation. A further advantage resides in the fact that sounds of high frequency are more susceptible to reflection from small objects than are low frequency sounds. Low frequency sound waves having correspondingly longer wave lengths have a tendency to pass over and around small objects with very little reflection, while sounds of higher frequency having wave lengths of the order of the physical dimensions of the object to be located will be reflected with greater intensity. Furthermore, if low frequency sound waves are projected toward an object to be located having an irregular surface accompanied by a general contour which lies at an obtuse or acute angle with respect to the line between the point of transmission and the object to be located, they will be reflected in a direction which is removed from the line joining the auditor's position and the object, thereby resulting in a small intensity of the received reflected sounds. However, if sound waves of high frequency and short wave length strike the irregular surface of an object to be located, they will be diffused by the several portions of the irregular surface and reflected with substantially uniform intensity. In this manner the intensity of the reflected sound waves in a given direction is substantially unaffected by the general contour of the reflecting surface and thus the intensity of the sound received by the auditor is enhanced.

The use of high frequency sound possesses an additional advantage in that it renders possible an elimination of the interfering noises which ordinarily disturb the acuity of the auditor's binaural response. The most disturbing interfering noises are ordinarily of quite low frequency ranging approximately from 1000 cycles per second downward. It will be seen that by using high frequencies ranging from 1500 to 5000 cycles per second, it is possible to filter out the low frequency disturbing noises and pass the high frequency signal sounds to the ears of the auditor. This insures an undisturbed precision in the auditing of the received reflected signal sounds.

On the other hand, the binaural sense of a human being is greater at the lower frequencies as, for example, below 1500 cycles. Accordingly it is desirable, when utilizing the binaural sense of the operator, that the ear be affected by low frequency sound waves. In accordance with my invention a plurality of high frequency sound waves, the frequencies of which are slightly different, are caused to beat together and the difference frequencies are utilized to affect the binaural sense. In this manner the advantages of high frequency sound are retained, while at the same time, advantage is taken of the maximum binaural response of the listener.

It is an object of my invention to provide an improved method and means for establishing the location of an object by means of reflected high frequency sound waves.

A further and more specific object of my invention is the provision of a sonic locator system and method of operating the same in which a plurality of high frequency sound waves of slightly different frequencies are projected in the direction of an object to be located and the beat frequencies of the reflected waves are utilized to excite an auditor's binaural sense and thereby establish the location of the object with respect to the auditor's position.

The novel features which I believe to be characteristic of my invention are set forth with particularity in the appended claims. My invention itself, however, both as to its organization and the method of operation, together with further objects and advantages thereof will best be understood by reference to the following specification taken in connection with the accompanying drawing, in which Fig. 1 shows one form of apparatus for carrying out my invention; and Fig. 2 illustrates diagrammatically a system arranged in accordance with my invention.

Referring to the drawing, I have shown in Fig. 1 my improved sonic locator apparatus as including high frequency sound generators 1, 2 and 3 provided respectively with horns 4, 5 and 6 for projecting the sound in a desired direction. The sound generators are shown in the form of whistles connected to a common compressed air source (not shown) by means of a pipe 7. It will, of course, be understood that any other suitable high frequency sound generating means such as sirens, or the like, may be employed. An air valve 8 having an operating stem 9 is interposed in the air supply line for regulating the duration of the emitted signal blasts. A suitable swivel joint 10 is also connected in the pipe 7 to permit the upper portion 11 thereof which carries the sound transmitting apparatus to be rotated in any direction by means of handles 12. Fixedly mounted on the rotatable portion 11 of the pipe 7 is the receiving apparatus which comprises receiving horns 13 and 14 connected to sound filters 15 by a pair of tubes 16. The filters 15 are connected at their sound output ends to a pair of stethoscopic ear pieces 17 by a pair of flexible tubes 18.

The frequency of the sound emitted by the generators 1, 2 and 3 should be of a high order, and I have found that frequencies lying within the range from 1500 to 5000 cycles per second are particularly satisfactory. The frequency of the sound emitted by the generator 1 should be either greater or less than the frequency of the sound emitted by the generator 2 by such an amount that the beat or difference frequency between the two sounds will be well within the lower part of the audibility range, and my experiments show that a beat frequency of approximately 500 cycles insures an excellent binaural discrimination. Similarly, the frequency of the sound generated by the generator 3 should be different from that generated by generators 1 and 2.

The operation of the above-described apparatus will best be understood by reference to Fig. 2 where I have shown the sound waves traveling from the transmission horns in a direction indicated by the line 19 toward an object 20 which it is desired to locate. The sound waves are projected from the horns 4, 5 and 6 in short blasts controlled by the valve 8 and are of a duration short with respect to the time of transmission from the horns to an object close at hand. The object 20 is shown for purposes of illustration as possessing an irregular surface having a general contour 21 which is at an obtuse angle with respect to the transmission and reflection line 19 drawn between the auditor's position indicated at 22 and the center of the object.

A portion of the sound waves projected by the generators 1, 2 and 3 along the line 19 strike the surface of the object 20 and are reflected along the line 19 to the auditor's position 22 where they enter the horns 13 and 14. It will, of course, be understood that the reflected sound waves are of frequencies corresponding to the frequencies of the propagated waves. The sound entering the horns 13 and 14 is conducted by means of the tubes 16 to the sound filters 15 which function to filter out the low frequency sounds created by interfering noises. These filters may be of the type shown and described in Patent No. 1,692,317 to G. W. Stewart, issued November 20, 1928. Briefly, the filters are designed to by-pass the reflected high frequency sound and to filter out sound of all frequencies lower than a predetermined value corresponding to the highest frequency components of any interfering noise.

From the filters 15 the reflected high frequency sound is conducted by means of tubes 18 and the ear pieces 17 to the ears of the auditor. It will be readily understood that sound waves of several frequencies will be impressed on the ears of the auditor including the three fundamental frequencies, the summation and the several beat, or difference frequencies. Due to the high value of the frequencies of the summation and the several fundamental sound waves, they are of reduced value in exciting the binaural sense. However, the beat frequencies between the several fundamental frequencies present, which beat frequencies lie in the lower portion of the audibility range, are of such an order that the binaural sense is acutely and accurately excited.

The excitation of the binaural sense of the auditor by the beat frequencies of the received sound permits an immediate assignment of the direction of the object from which the sound is being reflected. Thus, if the listening horns are in the positions indicated at 13', the auditor immediately knows that they should be rotated through a certain angle in a clockwise direction to point the horns toward the object. As such rotation is performed the volume of the received sound increases until a maximum intensity is obtained. In this position a line normal to the outer extremities of the horn and passing through the auditor's position will intersect the position of the object. It will be seen that the binaural sense of the auditor will substantiate the correctness of the directional indication given by the maximum intensity of the received sound.

Obviously, my improved apparatus may be provided with a suitable means for indicating the direction of the object following its location with respect to the auditor's position. A simple and convenient means for this purpose may include a stationary scale arranged to cooperate with a pointer mounted on the rotatable air conducting tube 11 to give directional indications. In addition a means may also be provided for measuring the distance of the auditor from the object. The conventional method of making such measurements is that of measuring the elapsed time between the projection of a signal blast and the reception of the reflected sound. Such a method and the means for carrying out the same are completely described in Patent No. 1,889,614 to Rice, issued November 29, 1932.

One of the advantages of my improved system is clearly emphasized by the sound intensity envelopes for high and low frequency sound illustrated at 23 and 24 respectively. When relatively low frequency sound is projected toward the object 20, it will be reflected with greatest intensity along the reflection line 25. The intensity along this line is represented for purposes of illustration by the vector OA and the intensity of the sound reflected toward the auditor's position may be represented by the vector OB. When, however, relatively high frequency sound strikes the surface of the object the irregular contour causes a diffusion thereof such that the intensity is more nearly uniform in all directions. Thus the intensity of the sound reflected along the line 19 may be represented by the vector OC and the intensity along the line 25 by the vector OD. It will readily be observed that the ratio of intensities of sound traveling respectively along the lines 19 and 24 is much greater for high frequency sound than for low frequency sound.

A further advantage of using high frequency sound may be attributed to the fact that if the wave length of the propagated sound is large with respect to the physical dimensions of the object to be located, the traveling sound will have a tendency to drift past the object with practically no reflection. To assume a particular example for purposes of illustration it may be supposed that sound waves having a frequency of 100 cycles per second corresponding to a wave length of 11 feet are projected in the direction of a post lying in the path of the sound which is 8 inches across. No explanation is necessary to show that the waves will be but slightly impeded in their progress by the small physical obstructing surface offered by the front of the post. However, if sound waves having a frequency of 3000 cycles corresponding to a wave length of 4.39 inches are propagated along the same path the effective obstructing surface is sufficient to cause a substantial portion of the waves striking the post to be reflected from the surface thereof.

It has been found that the binaural sense of the auditor is more effectively and accurately excited by using a plurality of high frequency sound sources having displaced frequencies separated by approximately 500 cycles per second. This may be explained by the effect on the auditor's binaural response to the several beat frequencies which are generated when sounds of more than two frequencies are employed. Thus, in the system illustrated where sounds of 2000, 2500 and 3000 cycles per second are used as the signal media, beat frequencies of 500, 1000 and 1500 cycles per second will be generated in the ears of the auditor. Obviously, the number of beat frequencies may be increased by separating the several projected fundamental frequencies by unequal amounts and by increasing the number of the fundamental frequencies propagated. My experiments show that such an increase in the number of the beat frequencies increases greatly the acuity of the binaural discrimination.

It will be readily apparent that my improved system may be used for many purposes, and that it is particularly adaptable for use on a moving craft as a means for locating objects positioned in the path of the craft. Thus, for example, if the sound generators 1, 2 and 3 and the receiving means are located on a ship which is maneuvering in a foggy harbor, the generators may be adjusted until the propagated sounds travel on a path coincident with the path of the craft. Any reflected sound waves will be picked up by the receiving apparatus and in this manner obstructions in the path of the craft or ship may be readily located. The sensitivity of the apparatus is such that small obstructions as, for example, small boats, bell buoys and the like, lying in the path of the craft may be easily detected and avoided. Thus, it will be seen that my improved system furnishes a positive aid to navigation in an obstructed area where the power of vision is impaired by natural conditions.

While I have shown a particular embodiment of my invention, it will of course be understood that I do not wish to be limited thereto since many modifications in the structure of the apparatus may be employed, and I contemplate by the appended claims to cover all such modifications as fall within the true spirit and scope of my invention.

What I claim as new and desire to secure by Letters Patent of the United States, is:

1. The method of locating an object which includes projecting a plurality of sound waves of different frequencies in a selected direction, and utilizing the beat frequencies of the sound waves reflected from the object to be located to excite the binaural sense of an auditor.

2. The method of locating an object which includes projecting a plurality of high frequency sound waves of different frequencies in a selected direction, and utilizing the beat frequencies of the sound waves reflected from the object to be located to excite the binaural sense of an auditor.

3. The method of locating an object which includes projecting a plurality of sound waves of different frequencies in a selected direction, filtering all interfering noises having a frequency lower than a predetermined value from the sound waves reflected from the object to be located, and utilizing the beat frequencies of the reflected sound waves to excite the binaural sense of an auditor.

4. The method of locating an object which includes projecting a plurality of high frequency sound waves of different frequencies in a selected direction, filtering all interfering noises having a frequency lower than a predetermined value from the waves reflected from the object to be located, and utilizing the beat frequencies thereof to excite the binaural sense of an auditor.

5. In a sonic locator system, sound generators for projecting a plurality of high frequency sound waves of different frequencies in a selected direction whereby said sound waves are reflected from an object to be located lying in the propagation path of the projected sound waves, and receiving means for conducting the sound waves reflected from said object to the ears of an auditor.

6. In a sonic locator system, sound generators for projecting a plurality of high frequency sound waves of different frequencies in a selected direction whereby said sound waves may be reflected from an object to be located lying in the propagation path of the projected sound waves, and receiving means for conducting the sound reflected from said object to the ears of an auditor, said last-named means including sound filter means for trapping low frequency waves created by interfering noises.

7. In a sonic locator system, sound generating means for projecting more than two sets of high frequency sound waves of different frequencies in a selected direction whereby said sound waves may be reflected by an object to be located lying in the propagation path of said sound waves, and receiving means for conducting the sound waves reflected from said object to the ears of an auditor, said last-named means including sound filter means for trapping low frequency waves created by interfering noises.

8. The method of locating an object which comprises projecting in a selected direction more than two sets of high frequency sound waves of different frequencies, said frequencies lying within the frequency range of 1500 to 5000 cycles per second, filtering all interfering noises having a sound frequency lower than a predetermined value from the sound waves reflected from the object to be located, and utilizing the beat frequencies of the reflected waves to excite the binaural sense of an auditor.

ALBERT J. MUCHOW.